(12) United States Patent
Chen

(10) Patent No.: US 11,652,506 B2
(45) Date of Patent: May 16, 2023

(54) TRANSCEIVER

(71) Applicant: REALTEK SEMICONDUCTOR CORPORATION, Hsinchu (TW)

(72) Inventor: Chien Wen Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/589,463

(22) Filed: Jan. 31, 2022

(65) Prior Publication Data

US 2023/0060378 A1 Mar. 2, 2023

(30) Foreign Application Priority Data

Aug. 26, 2021 (TW) ................................ 11013170.1

(51) Int. Cl.
*H04B 3/23* (2006.01)
*H04B 1/40* (2015.01)

(52) U.S. Cl.
CPC ............... *H04B 3/232* (2013.01); *H04B 1/40* (2013.01)

(58) Field of Classification Search
CPC .................................. H04B 3/232; H04B 1/40
See application file for complete search history.

(56) References Cited

U.S. PATENT DOCUMENTS

2006/0280234 A1* 12/2006 Gupta ..................... H04B 3/23
375/219
2011/0317564 A1* 12/2011 Saibi ...................... H04L 43/50
370/249

OTHER PUBLICATIONS

Yongjian Tang, Hans Hegt, Arthur Van Roermund, Predictive timing error calibration technique for RF current-steering DACs, IEEE, Mixed-signal Microelectronics Group, Eindhoven University of Technology, Eindhoven, Nertherlands.
Yongjian Tang, Hans Hegt, Arthur Van Roermund, DDL-based calibration techniques for timing errors in current-steering DACs, IEEE, Mixed-signal Microelectronics Group, Eindhoven University of Technology, Eindhoven, Nertherlands.

* cited by examiner

*Primary Examiner* — Sung S Ahn
(74) *Attorney, Agent, or Firm* — WPAT, P.C., Intellectual Property Attorneys; Anthony King

(57) ABSTRACT

A transceiver includes a first digital-to-analog converter (DAC), a second DAC, and a timing control module. In a calibration mode, the first DAC transmits a transmitting signal; the second DAC transmits an echo cancellation signal; and the timing control module, according to an echo signal of the transmitting signal and the echo cancellation signal, obtains a timing offset therebetween, and generates a first timing control signal and a second timing control signal to the first DAC and the second DAC according to the timing offset, respectively. The first DAC adjusts a transmission delay of transmitting the transmitting signal according to the first timing control signal, and/or the second DAC modifies a transmission delay of transmitting the echo cancellation signal according to the second timing control signal.

20 Claims, 4 Drawing Sheets

TRANSCEIVER

CROSS-REFERENCE TO RELATED APPLICATIONS

This application claims the benefit of priority to Patent Application No. 110131701, filed in Taiwan on Aug. 26, 2021, which is incorporated by reference in its entirety.

TECHNICAL FIELD

The present application relates to a transceiver, particularly to a transceiver capable of adjusting delay mismatch.

BACKGROUND

In transceivers, the transmission delay of the signal path may be different from an expectation due to non-ideal factors, resulting in higher signal distortion and noise, which in turn reduces the actual available dynamic range of the analog-to-digital converter. Therefore, how to improve the issue above has become one of the concerns in this field.

SUMMARY OF THE INVENTION

An aspect of present application provides a transceiver includes first digital-to-analog converter, a second digital-to-analog converter, and a timing control module. The first digital-to-analog converter is configured to output a transmitting signal in a calibration mode, The second digital-to-analog converter is configured to output an echo cancellation signal in the calibration mode. The timing control module, in the calibration mode, is configured to obtain a timing offset between an echo signal of the transmitting signal and the echo cancellation signal in the timing control module according to the echo signal and the echo cancellation signal, and generate a first timing control signal and a second timing control signal to the first digital-to-analog converter and the second digital-to-analog converter, respectively, according to the timing offset. The first digital-to-analog converter adjusts a transmission delay of transmitting the transmitting signal according to the first timing control signal, and/or the second digital-to-analog converter adjusts a transmission delay of transmitting the echo cancellation signal according to the second timing control signal.

Another aspect of the present application provides a transceiver includes a first digital-to-analog converter and a timing control module. The first digital-to-analog converter is configured to output a first signal and a second signal in a calibration mode. The timing control module includes a time-to-digital converter and a controller. The time-to-digital converter is configured to obtain a first time digital signal and a second time digital signal according to the first signal and the second signal in the calibration mode. The controller is configured to obtain a first timing offset between the first signal and the second signal in the timing control module according to the first time digital signal and the second time digital signal, and adjust a transmission delay of the first digital-to-analog converter transmitting the first signal and a transmission delay of the first digital-to-analog converter transmitting the second signal according to the first timing offset to reduce the first timing offset.

The transceiver of the present application uses a timing control module to adjust the transmission delay of the signal so that the timing error between signals is reduced and the signal noise is reduced.

BRIEF DESCRIPTION OF THE DRAWINGS

Various aspects of the present application can best be understood upon reading the detailed description below and accompanying drawings. It should be noted that the various features in the drawings are not drawn to scale in accordance with standard practice in the art. In fact, the size of some features may be deliberately enlarged or reduced for the purpose of discussion.

DETAILED DESCRIPTION

Figure 1:
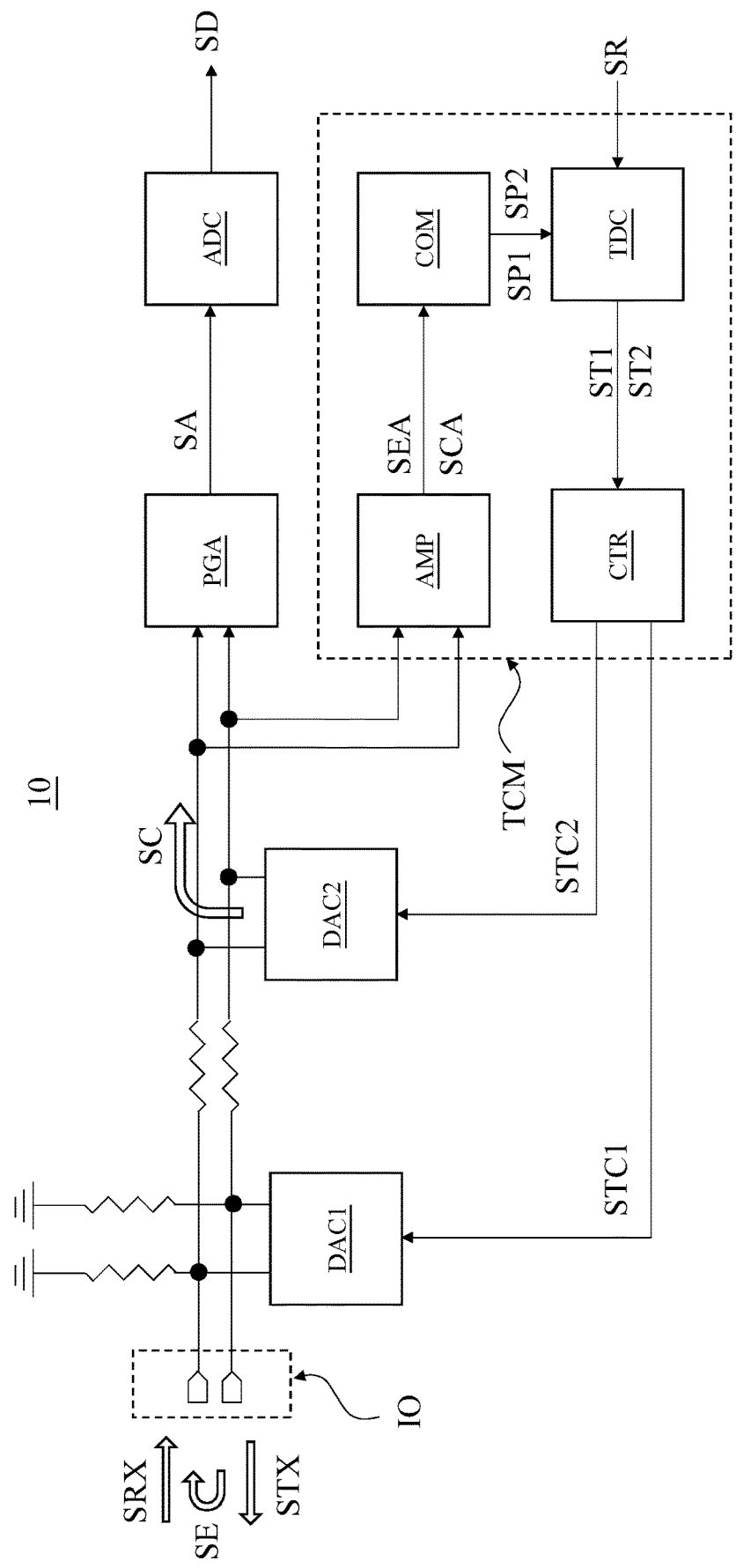
FIG. 1 is a schematic diagram illustrating a transceiver according to certain embodiments of the present application.

FIG. 1 is a schematic diagram illustrating a transceiver 10 according to certain embodiments of the present application. The transceiver 10 is in duplex mode and functions as a transmitter and a receiver. When the transceiver 10 transmits a transmitting signal STX and receives an input signal SRX, the transceiver 10 also receives an echo signal SE of the transmitting signal STX simultaneously. The echo signal SE increases the noise of the input signal SRX, so the transceiver 10 generates an echo cancellation signal SC internally to compensate the effect of the echo signal SE.

However, when the transmission delays of the echo signal SE and the echo cancellation signal SC are different so that there is a timing offset between the echo signal SE and the echo cancellation signal SC, it is difficult to fully cancel the echo signal SE and also infeasible to effectively reduce the noise of the input signal SRX. The transceiver 10 of the present application can adjust transmission delay(s) of the transmitting signal STX and/or the echo cancellation signal SC so as to adjust the timing offset between the echo signal SE and the echo cancellation signal SC.

The transceiver 10 includes a digital-to-analog converter DAC1 a digital-to-analog converter DAC2, a programmable gain amplifier PGA, analog-to-digital converter ADC, and a timing control module TCM.

An input/output terminal IO is configured to output the transmitting signal STX and receive the input signal SRX. Further, the input/output terminal IO also receives the echo signal SE of the transmitting signal STX. The digital-to-analog converter DAC2 is configured to generate the echo cancellation signal SC. In a general mode of the transceiver 10, the programmable gain amplifier PGA is configured to provide gain value to the input signal SRX to generate a gained input signal SA. The analog-to-digital converter ADC is configured to perform an analog-to-digital conversion on the gained input signal SA to generate a data signal SD. When a correspondence of timing between the echo signal SE and the echo cancellation signal SC has errors due to certain factors, the resultant noise would be amplified by the programmable gain amplifier PGA so that the noise of the gained input signal SA increases significantly. To solve this issue, in the present application, the transceiver 10 first enters a calibration mode before entering the general mode. In the calibration mode, the timing control module TCM adjusts the transmission delays of the echo signal SE and the echo cancellation signal SC according to the echo signal SE and the echo cancellation signal SC, thereby reducing the timing offset between the echo signal SE and the echo cancellation signal SC.

In some embodiments, in the calibration mode, the transceiver 10 transmits the transmitting signal STX to receive the echo signal SE; at this time, it does not transmit the echo cancellation signal SC, so that the timing control module TCM can first process the echo signal SE individually. Next, the transceiver 10 does not transmit the transmitting signal STX and only transmits the echo cancellation signal SC so that the timing control module TCM can process the echo cancellation signal SC individually.

The timing control module TCM includes a gain unit AMP, a comparator COM, a time-to-digital converter TDC, and a controller CTR.

The gain unit AMP is configured to provide a gain value to the echo signal SE and the echo cancellation signal SC to generate a gained echo signal SEA and a gained echo cancellation signal SCA, respectively. The gain unit AMP applies gain to the echo signal SE and the echo cancellation signal SC in order to have larger amplitude signals for subsequent signal processing. In some embodiments, the echo signal SE and the echo cancellation signal SC are differential signals, and the gain unit AMP is further configured to convert the plurality of differential signals into single-ended signals; however, the present disclosure is not limited thereto.

The comparator COM is configured to perform a comparison operation on the gained echo signal SEA and the gained echo cancellation signal SCA to respectively generate a comparison signal SP1 and a comparison signal SP2. The comparison signal SP1 and the comparison signal SP2 are digital signals. Specifically, the comparator COM compares the gained echo signal SEA with a reference value to generate the comparison signal SP1 and compares the gained echo cancellation signal SCA with the reference value to generate the comparison signal SP2. In some embodiments, the comparator COM performs an analog-to-digital conversion on the gained echo signal SEA and the gained echo cancellation signal SCA with a one-bit resolution to generate the comparison signal SP1 and the comparison signal SP2; however, the present application is not limited thereto. In further embodiments, the comparator COM also provides an additional gain to the gained echo signal SEA and the gained echo cancellation signal SCA during the comparison operation so that the thus-generated comparison signal SP1 and comparison signal SP2 have larger amplitudes.

Figure 2:
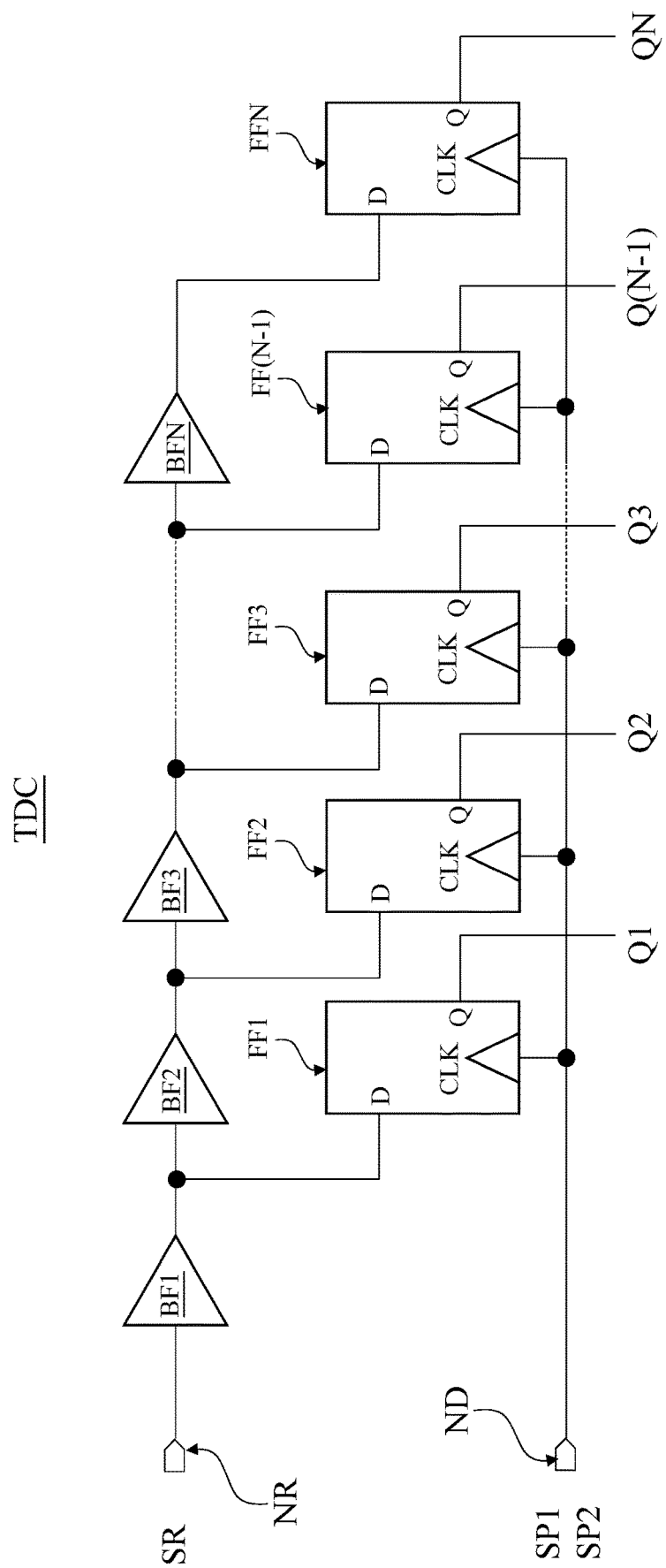
FIG. 2 is a schematic diagram illustrating a time-to-digital converter according to certain embodiments of the present application.

The time-to-digital converter TDC is configured to convert the comparison signal SP1 and the comparison signal SP2 to a time digital signal ST1 and a time digital signal ST2, respectively, according to reference signal SR Reference is also made to FIG. 2 for an operation of the time-to-digital converter TDC. FIG. 2 is a schematic diagram illustrating the time-to-digital converter TDC according to embodiments of the present application, The time-to-digital converter TDC includes a reference input terminal NR, a data input terminal ND, a plurality of delayers BF1-BFN, and a plurality of flip-flops FF1-FFN. In certain embodiments, the flip-flops FF1-FFN are D flip-flops.

The plurality of delayers BF1-BFN are coupled in series to the reference input terminal NR. The plurality of flip-flops FF1-FFN are coupled in parallel to the data input terminal ND and the output terminal of the corresponding one of the delays BF1-BFN, wherein a clock terminal CLK of each of the flip-flops FF1-FFN is coupled to the data. input terminal ND, the respective terminal D of the flip-flops FF1-FFN is coupled to the output terminal of the corresponding one of the delayers BF1-BFN, and the respective terminal Q of the flip-flops FF1-FFN is configured to output the data Q1-QN of each bit of the time digital signal ST1 and the time digital signal ST2. The reference input terminal NR is configured to receive the reference signal SR, wherein the reference signal SR is a clock signal. The data input terminal ND is configured to receive the comparison signal SP1 and the comparison signal SP2.

Before the timing offset between the echo signal SE and the echo cancellation signal SC is adjusted, the transmission delay of the echo signal SE differs from the transmission delay of the echo cancellation signal SC (i.e., the echo signal SE and the echo cancellation signal SC arrive the timing control module TCM at different times). and consequently, the comparison signal SP1 and the comparison signal SP2 also arrive time-to-digital converter TDC at different times. Therefore, when the comparison signal SP1 and the comparison signal SP2 enter the data input terminal ND at different times, the different two of the flip-flops FF1-FFN are activated, respectively. After the two of the flip-flops FF1-FFN are activated, the corresponding terminals Q generate data Q1-QN with different digital values from the terminals Q of the previous flip-flops FF1-FFN, such that the datas Q1-QN form the time digital signal ST1 and the time digital signal ST2. For example, for the time digital signals ST1=00011111 and ST2=00000011, the time offset between the comparison signal SP1 and the comparison signal SP2 is different by 3 minimum time units (referring to the minimum time unit of the time-to-digital converter TDC). In other words, the time digital signal ST1 and the time digital signal ST2 record the time difference of the transmission delay between the comparison signal SP1 and the comparison signal SP2. In some embodiments, the time difference of the transmission delays between the comparison signal SP1 and the comparison signal SP2 is approximately equal to the timing offset between the echo signal SE and the echo cancellation signal SC.

The controller CTR is configured to receive the time digital signal ST1 and the time digital signal ST2 and generate a timing control signal STC1 and a timing control signal STC2 to the digital-to-analog converter DAC1 and the digital-to-analog converter DAC2, respectively, according to the time difference recorded by the time digital signals ST1 and ST2. The digital-to-analog converter DAC1 and the digital-to-analog converter DAC2 further adjust the transmission delays of transmitting the transmitting signal STX and the echo cancellation signal SC according to the timing control signal STC1 and the timing control signal STC2, respectively. For example, when the time recorded by the time digital signals ST1 and ST2 indicates that the comparison signal SP2 arrives the time-to-digital converter TDC earlier than the comparison signal SP1 by 3 minimum time units, the digital-to-analog converter DAC1 does not adjust the transmission delay of transmitting the transmitting signal STX according to the timing control signal STC1, and the digital-to-analog converter DAC2 increases the transmission delay of transmitting echo cancellation signal SC by 3 minimum time units (i.e., the echo cancellation signal SC is outputted at 3 minimum time units later) according to the timing control signal STC2.

After the digital-to-analog converter DAC1 and the digital-to-analog converter DAC2 respectively adjust the transmission delays of transmitting the transmitting signal STX and the echo cancellation signal SC according to the timing control signal STC1 and the timing control signal STC2, the timing correspondence between the echo signal SE and the echo cancellation signal SC is calibrated to a correct correspondence. In certain embodiments, the timing offset between the echo signal SE and the echo cancellation signal SC is calibrated to (but not limited to) less than 1 minimum time unit. Afterward, the transceiver 10 exits the calibration mode and enters the general mode.

In some other embodiments, the timing control module TCM uses a phase detector to replace the time-to-digital converter TDC. The phase detector is configured to detect the phase difference between the comparison signal CP1 and the comparison signal CP2 and then uses the phase difference therebetween to generate the time digital signals ST1 and ST2.

Figure 3:
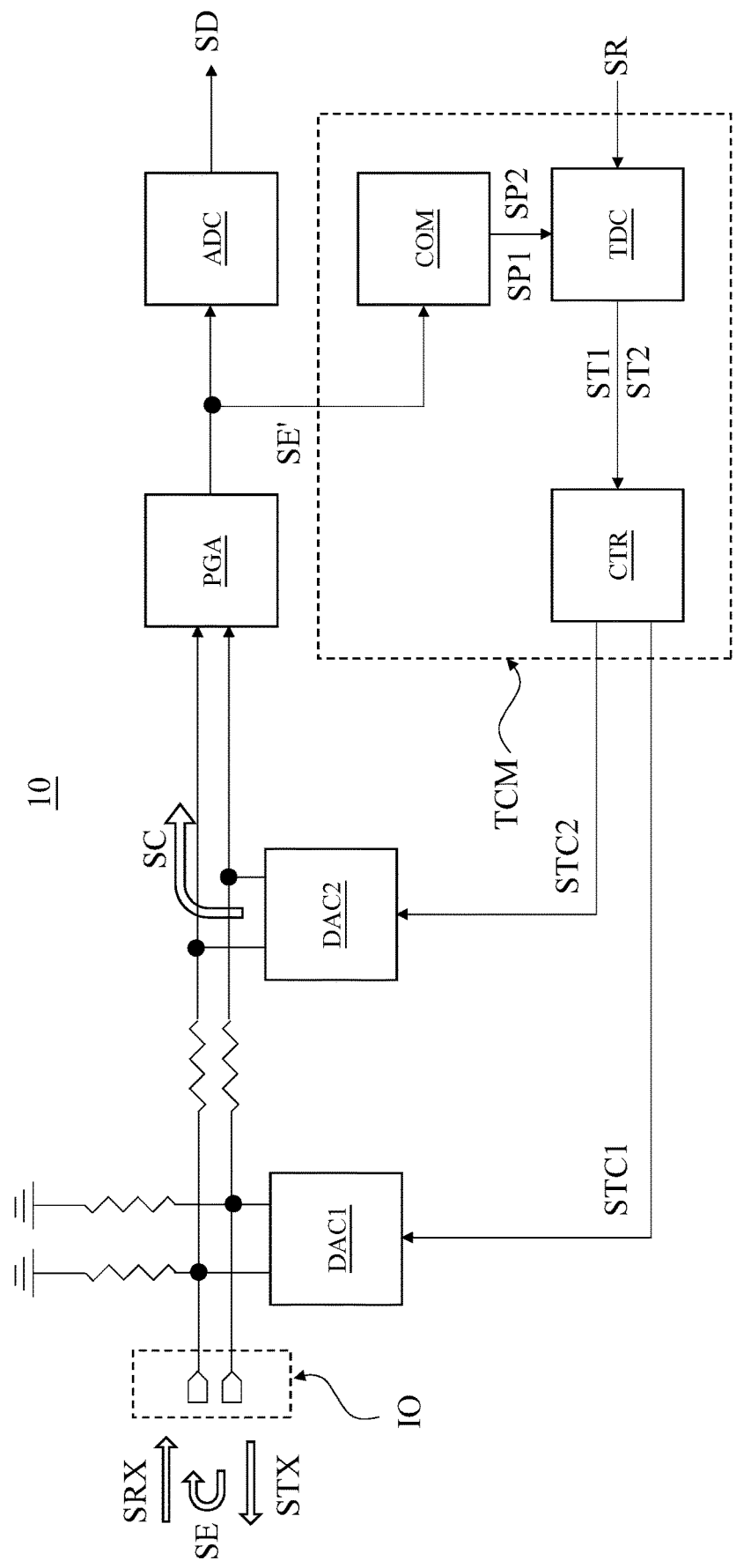
FIG. 3 is a schematic diagram illustrating a transceiver according to some other embodiments of the present application.

In certain embodiments, as shown in FIG. 3, the timing control module TCM does not include the gain unit AMP. The timing control module TCM is coupled to the output terminal of the programmable gain amplifier PGA and is configured to receive the echo signal SE and the echo cancellation signal SC that have been processed by the programmable gain amplifier PGA. In comparison with the embodiment of FIG. 1, in FIG. 3, the timing control module TCM uses a gained echo signal SE' that has been processed by the programmable gain amplifier PGA and the gained echo cancellation signal SC to replace the gained echo signal SEA and the gained echo cancellation signal SCA so as to generate the timing control signal STC1 and the timing control signal STC2.

Figure 4:
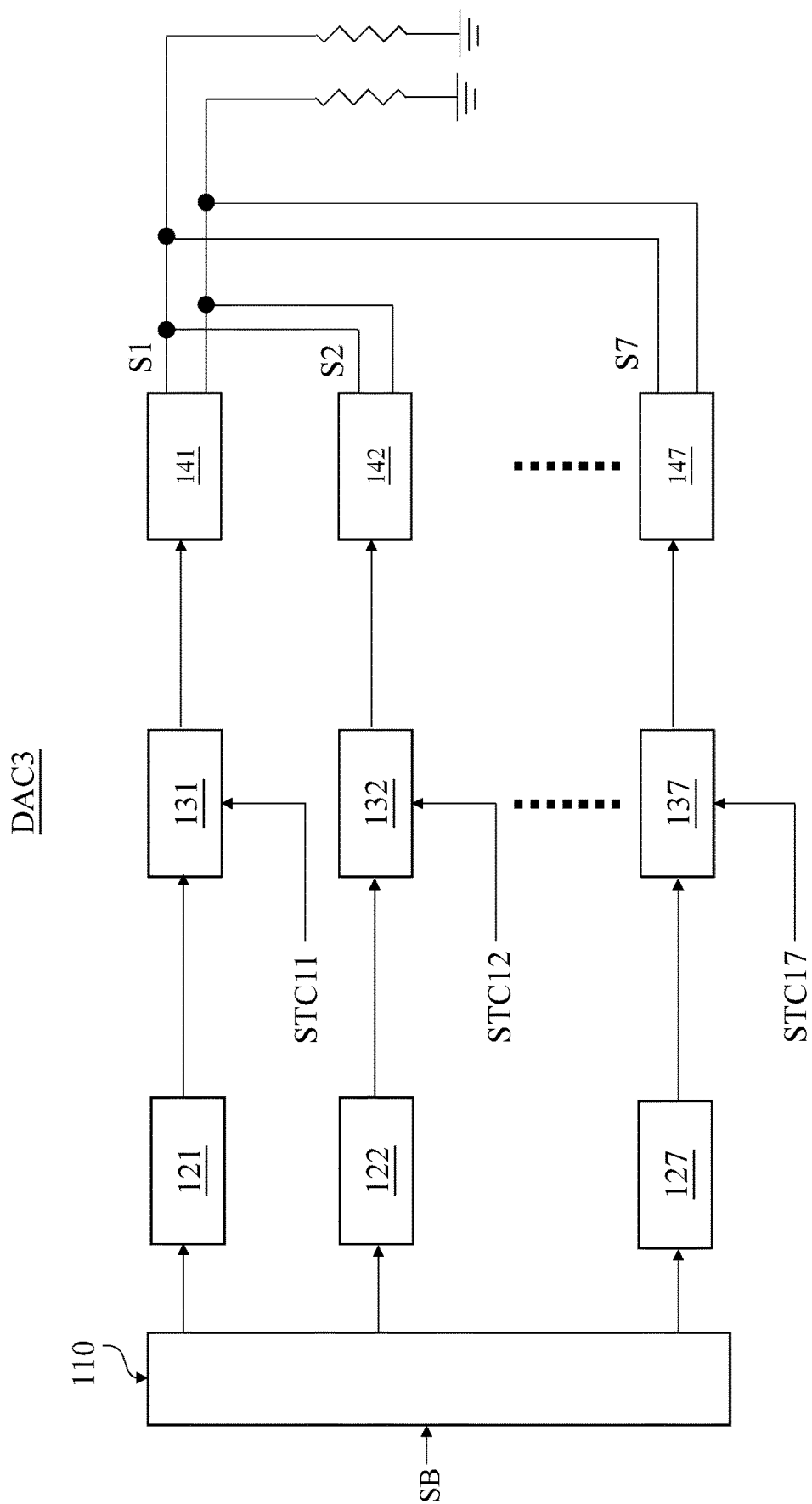
FIG. 4 is a schematic diagram illustrating a time-to-digital converter according to some other embodiments of the present application.

Reference is also made to FIG. 4. FIG. 4 is a schematic diagram illustrating a digital-to-analog converter DAC3 according to certain embodiments of the present application. The digital-to-analog converter DAC3 can be applied to the digital-to-analog converter DAC1 and/or the digital-to-analog converter DAC2 of the transceiver 10. The digital-to-analog converter DAC3 includes multiple current source paths. For example, the resolution of the digital-to-analog converter DAC3 is 3 bits, which has a current source path corresponding to the number of binary 3-bit thermometer codes (in this example, the number is 7, but some of the paths are omitted). Each current source path includes latches 121-127, delayers 131-137, and current generators 141-147 that are coupled to the binary-to-thermometer codec 110, respectively. When the binary signal SB is decoded by the binary-to-thermometer codec 110, and different current generators 141-147 are turned on, signals S1-S7 from different current generators 141-147 may have different transmission delays, thereby deteriorating the time delay error brought by the digital-to-analog converter DAC3 in addition to the integral non-linearity (INL) and differential non-linearity (DNL) parameters.

In order to reduce the mismatch in the delays of each current source path inside the digital-to-analog converter DAC3, the transceiver 10 is further configured to obtain the timing offset therebetween and then generate the timing control signal STC1 according to the timing offset between the signals S1-S7. In some embodiments, the digital-to-analog converter DAC3 sequentially turns on the current generators 141-147 according to equal intervals, so that the timing control module TCM can sequentially receive the signal S1, the sum of the signals S1-S2, and the sum of signals S1-S3 . . . and the sum of signals S1-S7. Therefore, the timing control module TCM can distinguish the transmission delay of each current source path through each signal change. The timing control signal STC1 includes timing control signals STC11-STC17 respectively transmitted to the delayers 131-137, and the digital-to-analog converter DAC3 receives the timing control signals STC11-STC17 and adjusts the delayers 131137 respectively to make the delay of each current source path consistent. It should be noted that when solving the problem of timing mismatch between the digital-to-analog converter DAC1 and the digital-to-analog converter DAC2, the timing control signals STC11-STC17 are equal to each other, that is, the extent to which that the transmission delay in each current source path in the digital-to-analog converter DAC1 is adjusted by the same offset. In contrast, when solving the problem of timing mismatch between the internal current source paths of the digital-to-analog converter DAC1, the timing control signals STC11-STC17 may be different from each other.

The foregoing description briefly sets forth the features of certain embodiments of the present application so that persons having ordinary skill in the art more fully understand the various aspects of the disclosure of the present application. It will be apparent to those having ordinary skill in the art that they can easily use the disclosure of the present application as a basis for designing or modifying other processes and structures to achieve the same purposes and/or benefits as the embodiments herein. It should be understood by those having ordinary skill in the art that these equivalent implementations still fall within the spirit and scope of the disclosure of the present application and that they may be subject to various variations, substitutions, and alterations without departing from the spirit and scope of the present disclosure.

What is claimed is:

1. A transceiver, comprising:
   a first digital-to-analog converter, configured to output a transmitting signal in a calibration mode;
   a second digital-to-analog converter, configured to output an echo cancellation signal in the calibration mode; and
   a timing control module, in the calibration mode, configured to obtain a timing offset between an echo signal of the transmitting signal and the echo cancellation signal in the timing control module according to the echo signal and the echo cancellation signal, and generate a first timing control signal and a second timing control signal to the first digital-to-analog converter and the second digital-to-analog converter, respectively, according to the timing offset,
   wherein the first digital-to-analog converter adjusts a transmission delay of transmitting the transmitting signal according to the first timing control signal, and/or the second digital-to-analog converter adjusts a transmission delay of transmitting the echo cancellation signal according to the second timing control signal.

2. The transceiver of claim 1, wherein the timing control module comprises:
   a comparator, configured to generate a first comparison signal and a second comparison signal according to the echo signal and the echo cancellation signal, respectively; and
   a controller, configured to generate the first timing control signal and the second timing control signal according to the first comparison signal and the second comparison signal.

3. The transceiver of claim 2, wherein the timing control module further comprises:
   a gain unit, configured to provide a gain value to the echo signal and the echo cancellation signal to generate a gained echo signal and a gained echo cancellation signal, respectively,
   wherein the comparator is configured to perform a comparison operation on the gained echo signal and the gained echo cancellation signal to generate the first comparison signal and the second comparison signal.

4. The transceiver of claim 3, wherein the timing control module further comprises:
a phase detector, configured to detect a phase difference between the echo signal and the echo cancellation signal according to the first comparison signal and the second comparison signal,
wherein the controller is configured to obtain the timing offset according to the phase difference.

5. The transceiver of claim 3, wherein the timing control module further comprises:
a time-to-digital converter, configured to convert the first comparison signal and the second comparison signal to a first time digital signal and a second time digital signal, respectively, according to a reference signal,
wherein the controller is configured to obtain the timing offset according to the first time digital signal and the second time digital signal.

6. The transceiver of claim 5, wherein the time-to-digital converter comprises:
a reference input terminal, configured to receive the reference signal;
a data input terminal, configured to receive the first comparison signal and the second comparison signal;
a plurality of delayers, coupled in series to the reference input terminal; and
a plurality of flip-flops, coupled in parallel between the plurality of delayers and the data input terminal.

7. The transceiver of claim 6, wherein each of the plurality of flip-flops comprises:
a D-terminal, coupled to a corresponding one of the plurality of delayers;
a Q-terminal, configured to generate a corresponding bit of the first time digital signal and the second time digital signal; and
a clock terminal, coupled to the reference input terminal.

8. The transceiver of claim 6, wherein the plurality of delayers are inverters, and the plurality of flip-flops are D flip-flops.

9. The transceiver of claim 5, wherein the controller is configured to calculate a time difference recorded by the first time digital signal and the second time digital. signal and obtain the timing offset according to the time difference.

10. The transceiver of claim 9, wherein after the first digital-to-analog converter and the second digital-to-analog converter are adjusted by the first timing control signal and the second timing control signal, the timing offset is reduced.

11. A transceiver, comprising:
a first digital-to-analog converter, configured to output a first signal and a second signal in a calibration mode; and
a timing control module, comprising:
a time-to-digital converter, configured to obtain a first time digital signal and a second time digital signal according to the first signal and the second signal in the calibration mode; and
a controller, configured to obtain a first timing offset between the first signal and the second signal in the timing control module according to the first time digital signal and the second time digital signal, and adjust a transmission delay of the first digital-to-analog converter transmitting the first signal and a transmission delay of the first digital-to-analog converter transmitting the second signal according to the first timing offset to reduce the first timing offset.

12. The transceiver of claim 11, wherein the timing control module further comprises:
a gain unit, configured to provide a gain value to the first signal and the second signal to generate a gained first signal and a gained second signal, respectively; and
a comparator, configured to perform a comparison operation on the gained first signal and the gained second signal to generate a first comparison signal and a second comparison signal.

13. The transceiver of claim 12, wherein the time-to-digital converter is configured to convert the first comparison signal and the second comparison signal to the first time digital signal and the second time digital signal, respectively, according to a reference signal, wherein the first time digital signal and the second time digital signal record a first time difference.

14. The transceiver of claim 13, wherein the first time difference is proportional to the first timing offset, wherein the controller is configured to generate a first timing control signal and a second timing control signal according to the first time difference.

15. The transceiver of claim 14, wherein the first digital-to-analog converter adjusts a transmission rate of outputting the first signal and a transmission rate of outputting the second signal according to the first timing control signal and the second timing control signal.

16. The transceiver of claim 11, wherein the first digital-to-analog converter in the calibration mode is further configured to output a transmitting signal, wherein the transceiver further comprises:
a second digital-to-analog converter, configured to output an echo cancellation signal in the calibration mode,
wherein the timing control module is further configured to obtain a second timing offset between an echo signal of the transmitting signal and the echo cancellation signal in the timing control module.

17. The transceiver of claim 16, wherein the gain unit is further configured to provide the gain value to the echo signal and the echo cancellation signal to generate a gained echo signal and a gained echo cancellation signal, respectively, wherein the comparator is further configured to perform the comparison operation on the gained echo signal and the gained echo cancellation signal to generate a third comparison signal and a fourth comparison signal.

18. The transceiver of claim 17, wherein the time-to-digital converter further configured to convert the third comparison signal and the fourth comparison signal to a third time digital signal and a fourth time digital signal, respectively, according to a reference signal, wherein the third time digital signal and the fourth time digital signal records a second time difference.

19. The transceiver of claim 18, wherein the second time difference is proportional to a second timing offset, wherein the controller further configured to generate a third timing control signal and a fourth timing control signal according to the second time difference.

20. The transceiver of claim 19, wherein the first digital-to-analog convert signal adjusts a transmission delay of the output of the transmitting signal according to the third timing control signal, and the second digital-to-analog converter adjusts a transmission delay of the output of the echo cancellation signal according to the fourth timing control signal, so as to reduce the second timing offset.

* * * * *